US012710279B2

(12) United States Patent
Patel

(10) Patent No.: US 12,710,279 B2
(45) Date of Patent: Aug. 18, 2026

(54) SYSTEMS AND METHODS FOR ALTERING NAVIGATION INSTRUCTIONS BASED ON THE CONSUMPTION TIME OF MEDIA CONTENT

(71) Applicant: Adeia Guides Inc., San Jose, CA (US)

(72) Inventor: Milan Indu Patel, Santa Clara, CA (US)

(73) Assignee: ADEIA GUIDES INC., San Jose, CA (US)

( * ) Notice: Subject to any disclaimer, the term of this patent is extended or adjusted under 35 U.S.C. 154(b) by 22 days.

(21) Appl. No.: 18/824,371

(22) Filed: Sep. 4, 2024

(65) Prior Publication Data

US 2025/0130051 A1 Apr. 24, 2025

Related U.S. Application Data

(63) Continuation of application No. 18/141,701, filed on May 1, 2023, now Pat. No. 12,111,164, which is a continuation of application No. 17/694,256, filed on Mar. 14, 2022, now Pat. No. 11,680,805, which is a continuation of application No. 16/488,072, filed as application No. PCT/US2017/018796 on Feb. 22, 2017, now abandoned.

(51) Int. Cl.
*G01C 21/34* (2006.01)
*H04N 21/414* (2011.01)

(52) U.S. Cl.
CPC ..... *G01C 21/3415* (2013.01); *G01C 21/3453* (2013.01); *H04N 21/41422* (2013.01)

(58) Field of Classification Search
CPC ............ G01C 21/3415; G01C 21/3453; H04N 21/41422
USPC ......................................................... 701/411
See application file for complete search history.

(56) References Cited

U.S. PATENT DOCUMENTS 6,239,794 B1 * 5/2001 Yuen .................... H04N 7/0887 348/565
6,388,714 B1 * 5/2002 Schein ............... H04N 21/2543 348/E7.024
6,405,130 B1 * 6/2002 Piwowarski ..... G08G 1/096844 701/410
6,564,378 B1 * 5/2003 Satterfield ........ H04N 21/42206 725/39
6,756,997 B1 * 6/2004 Ward, III ........... H04N 21/4345 348/E7.071
7,069,144 B2 * 6/2006 Yoshihara .............. G01C 21/34 701/410

(Continued)

FOREIGN PATENT DOCUMENTS

WO 2013/139690 A1 9/2013

*Primary Examiner* — Luis A Martinez Borrero
(74) *Attorney, Agent, or Firm* — HG LAW LLP

(57) ABSTRACT

Systems and methods are described ensuring that a user will be able to consume selected media content in its entirety. In particular, a media guidance application described herein determines an amount of time (102) required to reach a destination (116) and compares this time to an amount of time required to consume media content (104). If the amount of time (104) exceeds the amount of time (102) required to reach the destination, it calculates a route (120) for a current trip in which the length of time required to traverse a calculated route corresponds to the play length of the selected media asset.

20 Claims, 9 Drawing Sheets

(56) References Cited

U.S. PATENT DOCUMENTS 7,165,098 B1* 1/2007 Boyer ................ H04N 21/4782 709/219
7,761,892 B2* 7/2010 Ellis .................. H04N 21/2143 725/86
7,996,422 B2 8/2011 Shahraray et al.
8,046,801 B2* 10/2011 Ellis .................. H04N 21/4821 725/38
8,239,410 B2 8/2012 Shahraray et al.
8,370,061 B2* 2/2013 Hiyokawa ............. G01C 21/34 701/410
8,909,476 B2* 12/2014 Tuukkanen ........... G06F 3/0481 701/538
8,990,848 B2* 3/2015 Basso .................... G06Q 30/02 725/32
9,014,546 B2* 4/2015 Shimy ................ H04N 21/4755 386/296
9,026,555 B2 5/2015 Shahraray et al.
9,200,913 B2* 12/2015 Sano .................. G01C 21/3492
9,363,544 B2 6/2016 Tomita
9,390,757 B2 7/2016 Shahraray et al.
9,423,263 B2 8/2016 Tuukkanen
9,528,850 B1* 12/2016 Hobbs ................. B60W 60/001
9,567,080 B2* 2/2017 Bookless ............... G06Q 10/20
9,739,622 B2* 8/2017 Yamashita ......... G01C 21/3484
9,866,888 B1* 1/2018 Thomas ............. H04N 21/2668
9,945,684 B2* 4/2018 Bhatt ................. G01C 21/3484
9,948,966 B1* 4/2018 Panchaksharaiah ........................ H04N 21/26283
10,038,929 B1* 7/2018 Thomas ........... H04N 21/44222
10,198,748 B2 2/2019 Shahraray et al.
10,319,235 B2* 6/2019 Gupta .................... G08G 1/164
10,484,494 B2 11/2019 Saito
10,605,617 B2 3/2020 Andrew et al.
10,949,457 B2 3/2021 Deluca et al.
11,019,165 B2 5/2021 Saito
11,023,515 B2 6/2021 Daz et al.
11,314,831 B2* 4/2022 Ogden ................ G06F 16/9537
11,412,055 B2 8/2022 Saito
11,680,805 B2* 6/2023 Patel ...................... G01C 21/34 701/411
12,111,164 B2* 10/2024 Patel .................. G01C 21/3415
2002/0174430 A1* 11/2002 Ellis ................... H04N 21/4753 386/230
2003/0110499 A1* 6/2003 Knudson ............ G06Q 30/0251 348/E7.071
2004/0148098 A1* 7/2004 Yato ....................... G01C 21/34 340/995.19
2004/0220729 A1* 11/2004 Park ................... G01C 21/3415 701/410
2005/0251827 A1* 11/2005 Ellis ....................... H04N 21/84 348/E5.103
2008/0103686 A1* 5/2008 Alberth ................ G01C 21/343 701/532
2009/0143978 A1* 6/2009 Wong ..................... G01C 21/34 701/533
2010/0023544 A1* 1/2010 Shahraray ............ G11B 27/105 707/E17.009
2010/0153885 A1 6/2010 Yates
2012/0209511 A1* 8/2012 Isert ....................... G01C 21/34 701/425
2013/0253833 A1* 9/2013 Tuukkanen ........... G06F 3/0481 701/538
2013/0332297 A1* 12/2013 Forutanpour ...... G01C 21/3461 705/26.1
2014/0281976 A1* 9/2014 Chia ..................... G06F 16/954 715/716
2015/0088423 A1* 3/2015 Tuukkanen ............ G01C 21/26 701/538
2015/0276412 A1* 10/2015 Cudak ................ G01C 21/3453 701/465
2015/0292894 A1* 10/2015 Goddard ............ G01C 21/3453 701/400
2015/0350709 A1* 12/2015 Tomita ................. H04N 21/462 725/32
2016/0003632 A1* 1/2016 Masuda ........... G08G 1/096775 701/522
2016/0321699 A1 11/2016 Shahraray et al.
2018/0007155 A1* 1/2018 Saito ..................... H04L 67/535
2018/0094939 A1* 4/2018 Holmes ................ G01C 21/343
2018/0192150 A1* 7/2018 Schmidt ............. H04N 21/2387
2018/0357233 A1* 12/2018 Dazé ....................... H04L 67/12
2019/0219418 A1* 7/2019 Andrew ................. G01C 21/28
2020/0011678 A1* 1/2020 Patel ...................... G01C 21/34
2020/0073954 A1* 3/2020 DeLuca .............. G06F 16/4393
2020/0120174 A1 4/2020 Saito
2020/0288208 A1* 9/2020 Meyer ................ H04N 21/2387
2021/0258395 A1 8/2021 Sakura
2021/0286838 A1 9/2021 Daz et al.
2021/0389138 A1* 12/2021 Morton ............ G08G 1/096791
2022/0268588 A1* 8/2022 Patel ................ H04N 21/41422
2022/0316898 A1* 10/2022 Mayster ............. G01C 21/3484
2022/0333934 A1* 10/2022 Grealish-Rust ...... G01C 21/343
2023/0035604 A1 2/2023 Saito
2023/0273030 A1* 8/2023 Patel ...................... G01C 21/34 701/411

* cited by examiner

```
800 ...
801 Initialization Subroutine determine a first path from a first node to a final node,
wherein the first path includes a second node between the first node and the final node
802 ...
803 //Routine to determine a first travel time, wherein the first travel time corresponds to
an amount of time required to traverse the first path in a vehicle
804 ...
805 Store the first travel time in memory
806 ...
807 Receive a user request to consume a media asset
808 ...
809 //Routine to determine a threshold time, wherein the threshold time corresponds to
an amount of time required to consume the media asset in its entirety
810 ...
811 Store the threshold time in the memory
812 ...
813 Retrieve the first travel time and the threshold time from the memory
814 ...
815 //Routine to determine whether the threshold time exceeds the first travel time
816 ...
817 //Routine to determine a second path from a first node to a final node, wherein the
second path includes a third node between the first node and the final node
818 ...
819 //Routine to determine a second travel time, wherein the second travel time
corresponds to an amount of time required to traverse the second path in the vehicle
820 ...
821 Store the second travel time in memory
822 ...
823 Retrieve the second travel time and the threshold time from the memory
824 ...
825 //Routine to determine whether the second time equals or exceeds the threshold
time
826 ...
827 For each media asset:
828     Store boolean A = whether the first travel time equals or exceeds the threshold
time
829     Store boolean B = whether the second time equals or exceeds the threshold time
830     If A == True, then:
831             Execute Subroutine to generate navigation instructions for the vehicle,
                wherein the navigation instructions are based on the first path
832     If B == True, then:
833             Execute Subroutine to generate navigation instructions for the vehicle,
        wherein the navigation instructions are based on the second path
834 ...
835 Termination Subroutine
```

FIG. 8

SYSTEMS AND METHODS FOR ALTERING NAVIGATION INSTRUCTIONS BASED ON THE CONSUMPTION TIME OF MEDIA CONTENT

CROSS-REFERENCE TO RELATED APPLICATIONS

This application is a continuation of U.S. patent application Ser. No. 18/141,701, filed May 1, 2023, which is a continuation of U.S. patent application Ser. No. 17/694,256, filed Mar. 14, 2022, now U.S. Pat. No. 11,680,805, which is a continuation of U.S. patent application Ser. No. 16/488,072, filed Aug. 22, 2019, which is a national stage application under 35 U.S.C. § 371 of International Application PCT/US2017/018796, filed Feb. 22, 2017, the disclosures of which are hereby incorporated by reference herein in their entireties.

BACKGROUND

Due to the increase in wireless technology, media is now accessible to users in places and forums where it traditionally was not. For example, a user may wish to access media content while travelling (e.g., in a car, bus, plane, etc.). However, if the length of the trip is shorter than the length of the media content, the users will not be able to consume the media content in its entirety.

SUMMARY

Accordingly, systems and methods are described herein ensuring that a user will be able to consume selected media content in its entirety. In particular, a media guidance application described herein calculates a route for a current trip in which the length of time required to traverse a calculated route corresponds to the play length of the selected media asset. Accordingly, the user will complete playback of the media content during the current trip and will not have to pause and resume (or worry about not being able to resume the media content on a different device) after the current trip. For example, if the length of the selected media content is longer than the amount of time required to reach a destination, then an alternate route is proposed to the user so that the new time required to reach the destination is longer than the length of the movie.

In some aspects, a media guidance application may determine a first path from a first node to a final node, wherein the first path includes a second node between the first node and the final node. The determination of a path may be performed using any suitable best path algorithm such as Dijkstra's algorithm, A*, and breadth-first search. In some embodiments, the first path is defined by a series of roads, traversable with a vehicle, connecting the first node to the final node. The road may be a paved road and may be a local road or a highway. In some embodiments, the first node corresponds to an intersection of a plurality of roads, wherein each of the plurality of roads is traversable with a vehicle. The intersection may be of two local roads, two highways, or a local road and a highway.

The media guidance application may determine a first travel time, wherein the first travel time corresponds to an amount of time required to traverse the first path in a vehicle. The determination may be made using a navigation system of the self-driving car. In some embodiments, the first travel time may include travel delays associated with traffic and weather.

The media guidance application may store the first travel time in memory. Storing the first travel time in memory may be performed using processing circuitry and any suitable storage device. In some embodiments, the first travel time may be dynamically updated if travel conditions change during the trip.

The media guidance application may receive a user request to consume a media asset. For example, the user may use a user interface to select a movie to consume during the trip. The user interface may comprise a touch-screen display. In some embodiments, the user request may be performed using a voice command.

The media guidance application may determine a threshold time, wherein the threshold time corresponds to an amount of time required to consume the media asset in its entirety. The amount of time required to consume the media asset in its entirety may be retrieved from metadata associated with the media asset.

The media guidance application may store the threshold time in the memory. The threshold time may be stored in the same storage device as the first travel time. In some embodiments, the media guidance application may adjust the threshold time based on a fast-access playback operation received while the user is consuming the media asset. For example, if the user selects to skip a portion of the movie, the threshold time is dynamically reduced an amount equal to the duration of the skipped portion of the movie.

The media guidance application may retrieve the first travel time and the threshold time from the memory. Retrieval of the first travel time and the threshold time may be performed using processing circuitry from the storage device where the first travel time and threshold time is stored.

The media guidance application may compare the first travel time and the threshold time. For example, if the first travel time exceeds the threshold time, then the media asset will be consumed in its entirety before the vehicle arrives at the destination and the vehicle may use the first path to determine the route. If the first travel time does not exceed the threshold time, then the media asset cannot be consumed in its entirety before the vehicle arrives at the destination using the first path.

The media guidance application may, in response to determining that the threshold time exceeds the first travel time, determine a second path from a first node to a final node, wherein the second path includes a third node between the first node and the final node. In some embodiments, the second path may include the second node. For example, the first path may comprise travelling on a highway for the majority of the path and the second path may comprise travelling on local roads for the majority of the path.

The media guidance application may determine a second travel time, wherein the second travel time corresponds to an amount of time required to traverse the second path in the vehicle. The second travel time may exceed the first travel time if a longer route is determined.

The media guidance application may store the second travel time in memory. Storing the second travel time in memory may be performed using processing circuitry and the same storage device where the first travel time and threshold time is stored. In some embodiments, the second travel time may be dynamically updated if travel conditions change during the trip.

The media guidance application may retrieve the second travel time and the threshold time from the memory. Retrieval of the second travel time and the threshold time may be performed using processing circuitry from the storage device where the second travel time and threshold time is stored.

The media guidance application may compare the second travel time and the threshold time. For example, if the second travel time exceeds the threshold time, then the media asset will be consumed in its entirety before the vehicle arrives at the destination, and the vehicle may use the second path to determine the route. If the second travel time does not exceed the threshold time, then the media asset cannot be consumed in its entirety before the vehicle arrives at the destination using the second path.

The media guidance application may, in response to determining that the second time equals or exceeds the threshold time, generate navigation instructions for the vehicle, wherein the navigation instructions are based on the second path. In some embodiments, the media guidance application may generate for display the navigation instructions on a user interface in the vehicle. In some embodiments, the media guidance application may receive a user request to transmit the navigation instructions to a navigation system in the vehicle.

In some embodiments, the media guidance application may receive a user request to ignore the navigation instructions. The media guidance application may then generate secondary navigation instructions for the vehicle, wherein the secondary navigation instructions are based on the first path. The media guidance application may then transmit the secondary navigation instructions to the navigation system in the vehicle. For example, if the user requests to watch a movie during a trip in a self-driving car, the user may be more interested in arriving at the destination as soon as possible instead of watching the movie in its entirety during the trip in the self-driving car.

In some embodiments, the media guidance application may generate an indication that the media guidance cannot be consumed in its entirety. The media guidance application may generate for display the indication on the user interface in the vehicle. For example, if a user requests to watch a movie that is longer than the first travel time, the user may receive an indication on the user interface in the self-driving car that the movie cannot be watched in its entirety using the first path.

In some embodiments, the media guidance application may determine that the vehicle has arrived at the final node. The media guidance application may then receive a user request to finish consuming the media asset outside of the vehicle. For example, if the user is watching a movie in the self-driving car that has not been watched in its entirety before arriving at the user's home, the user may request to finish watching the movie on the user's television in their home.

In some embodiments, the media guidance application may determine the vehicle has begun traversing the second path. The media guidance application may then determine a third travel time, wherein the third travel time corresponds to an amount of time required to traverse a remainder of the second path in the vehicle. The media guidance application may then initiate playback of the media asset. The media guidance application may then store the third travel time in the memory. The media guidance application may then determine a revised threshold time, wherein the revised threshold time corresponds to an amount of time required to consume the remainder of the media asset in its entirety after initiating playback. In some embodiments, the media guidance application may store the revised threshold time in the memory. The media guidance application may then retrieve the third travel time and the revised threshold time from the memory. The media may then compare the third travel time and the revised threshold time. In some embodiments, in response to determining that the third travel time does not exceed the revised threshold time, the media guidance application may alert the user.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 8 shows an illustrative example of pseudocode for calculating a route in accordance with some embodiments of the disclosure;

DETAILED DESCRIPTION

Systems and methods are described herein ensuring that a user will be able to consume selected media content in its entirety. In particular, a media guidance application described herein calculates a route for a current trip in which the length of time required to traverse a calculated route corresponds to the play length of the selected media asset. Accordingly, the user will complete playback of the media content during the current trip and will not have to pause and resume (or worry about not being able to resume the media content) after the current trip. For example, if the length of the selected media content is longer than the amount of time required to reach a destination, then an alternate route is proposed to the user so that the new time required to reach the destination is longer than the length of the movie.

Figure 1:
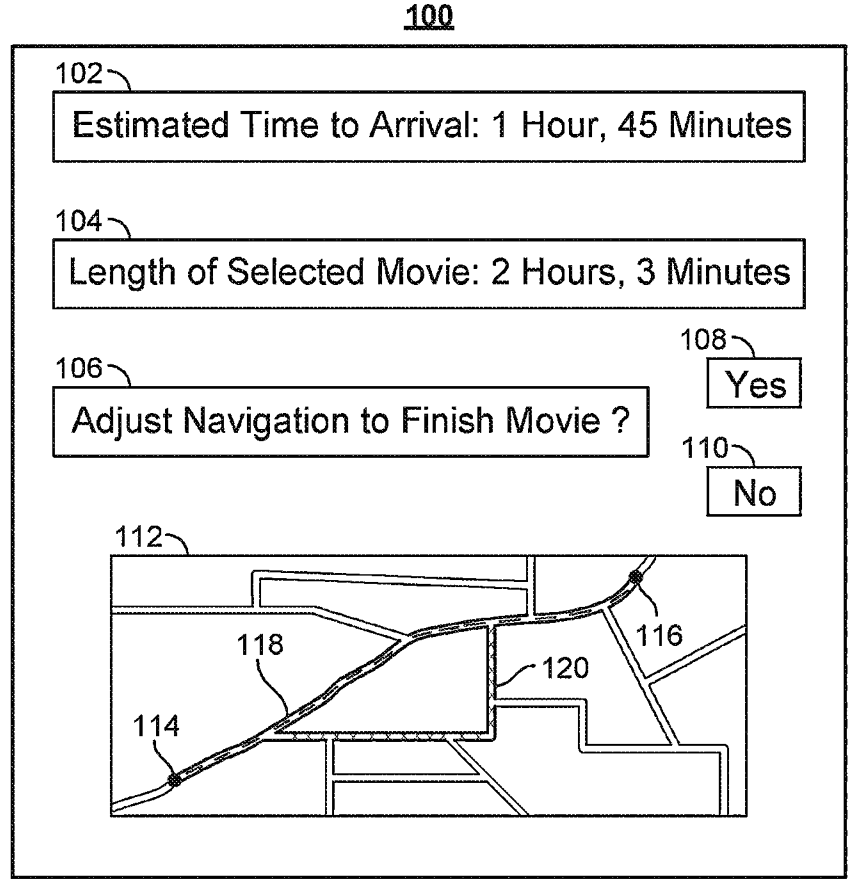
FIG. 1 is an illustrative example of a navigation display screen in accordance with some embodiments of the disclosure.

FIG. 1 is an illustrative example of a navigation display screen in accordance with some embodiments of the disclosure. For example, a media guidance application as described herein may generate navigation display screen 100 or the information used by, or transmitted to, navigation display screen 100. For example, navigation display screen 100 may be incorporated into, or accessible by, a device upon which a media guidance application is implemented. Navigation display screen 100 may include arrival time region 102 and media asset length region 104. Arrival time region 102 may display the estimated time to arrival of the current route. For example, the media guidance application may determine the estimated time to arrival by determining a best path from a first node to a final node and determining a travel time corresponding to the amount of time required to traverse the best path, as discussed below. Media asset length region 104 may display the length of the selected media asset. For example, the media guidance application may determine a threshold time that corresponds to an amount of time required to consume the media asset in its entirety, as discussed below. For example, if the user selected a movie to be consumed during the current trip, the length of the selected movie may be displayed. The estimated time displayed in arrival time region 102 and media asset length region 104 may comprise an amount of time in hours and minutes. In some embodiments, the estimated time displayed in arrival time region 102 and media asset length region 104 may comprise an amount of time in minutes and seconds.

Navigation display screen 100 may include navigation query region 106, affirmative response region 108, and negative response region 110. Navigation query region 106 may display a query related to the information displayed in arrival time region 102 and media asset length region 104. For example, the media guidance application may determine whether the amount of time required to consume the media asset in its entirety exceeds the travel time, as discussed below. For example, navigation query region 106 may display a query related to whether to adjust navigation in order to finish watching the selected media asset. Affirmative response region 108 may display an affirmative indication in relation to the query in navigation query region 106. For example, the word "yes" may be displayed in affirmative response region 108. In a further example, a checkmark may be displayed in affirmative response region 108. Negative response region 110 may display a negative indication in relation to the query in navigation query region 106. For example, the word "no" may be displayed in negative response region 110. In a further example, an "X" may be displayed in negative response region 110.

Navigation display screen 100 may be a touchscreen. For example, the user may touch the region of navigation display screen 100 corresponding to affirmative response region 108 in order to affirmatively respond to the query in navigation query region 106. In a further example, the user may touch the region of navigation display screen 100 corresponding to negative response region 110 in order to negatively respond to the query in navigation query region 106.

Navigation display screen 100 may include map region 112. Map region 112 may include departure point 114 and destination point 116. Departure point. 114 and destination point 116 may correspond to physical locations. For example, departure point 114 may correspond to the user's home address and destination point 116 may correspond to a hotel. Map region 112 may include original route 118 and alternate route 120. Original route 118 may correspond to the fastest route between departure point 114 and destination point 116. For example, the media guidance application may determine the fastest path between a first node and a final node and generate navigation instructions for the vehicle based on the first path, as discussed below. Alternate route 120 may correspond to a longer route between departure point 114 and destination point 116. For example, the media guidance application may determine a second path between a first node and a final node and generate navigation instructions for the vehicle based on the second path, as discussed below.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. Another type of media guidance application is a navigation guidance application. Navigation guidance applications are well known guidance applications that, among other things, allow users to select and visualize navigation data. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance. As referred to herein, the term "navigation data" should be understood to mean any data related to data used in operating the navigation guidance application. For example, the navigation data may include map data, traffic data, global positioning system data, navigation directions, and any other type of guidance data that is helpful for a user to select and visualize navigation instructions.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections. In some embodiments, guidance data may include navigation data that is helpful for a user to select and visualize navigation instructions.

Figures 2, 3:
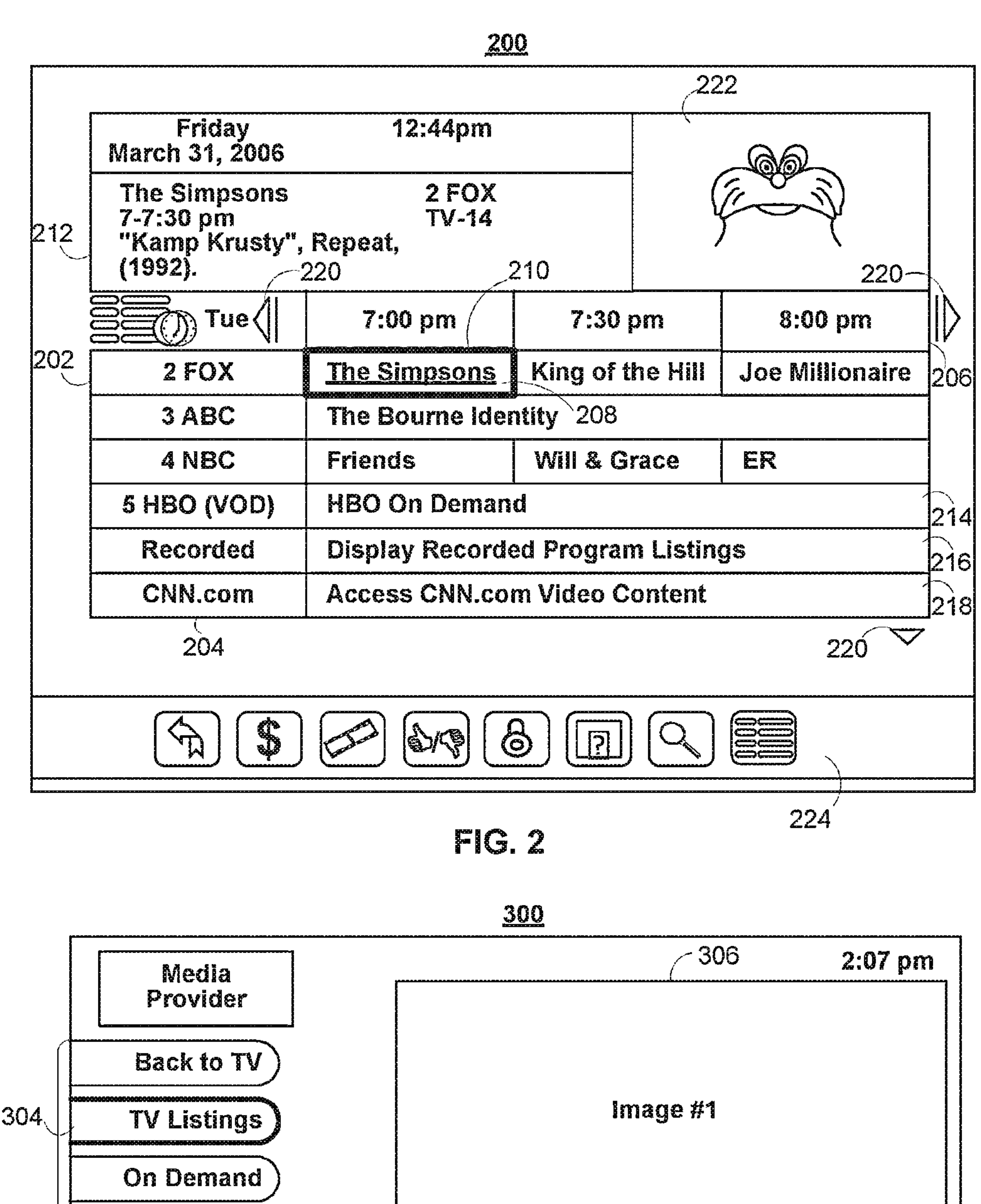
FIG. 2 shows an illustrative example of a display screen for use in accessing media content in accordance with some embodiments of the disclosure.
FIG. 3 shows another illustrative example of a display screen used in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria, FIG. 2 shows illustrative grid of a program listings display 200 arranged by time and channel that also enables access to different types of content in a single display. For example, navigation display screen 100 may include program listings display 200 in order to allow the user to navigate and select a media asset to consume during the trip. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. For example, navigation display screen 100 may include video mosaic display 300 in order to allow the user to navigate and select a media asset to consume during the trip. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
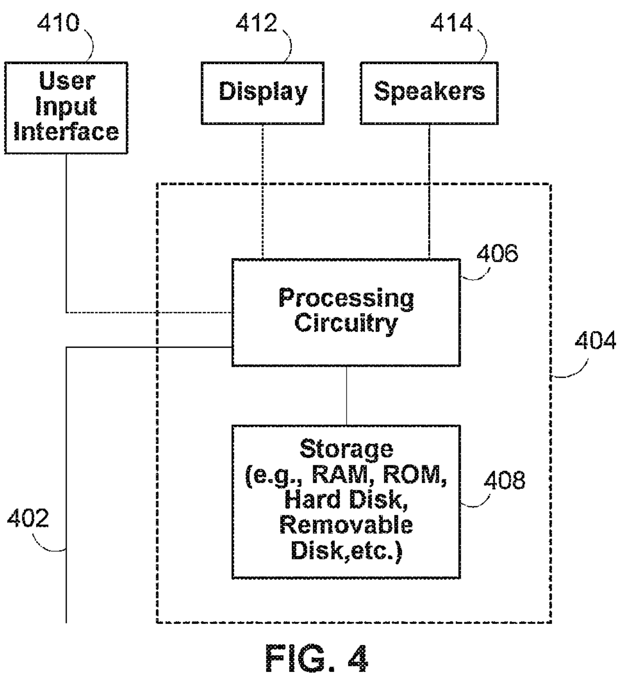
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment device 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment device 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D.

A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from user input interface 410. For example, movement of a cursor on a display up/down may be indicated by the processed instructions when user input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on user equipment device 400. This way, the processing of the instructions is performed remotely by the server while the resulting displays are provided locally on user equipment device 400. Equipment device 400 may receive inputs from the user via user input interface 410 and transmit those inputs to the remote server for processing and generating the corresponding displays. For example, user equipment device 400 may transmit a communication to the remote server indicating that an up/down button was selected via user input interface 410. The remote server may process instructions in accordance with that input and generate a display of the application corresponding to the input (e.g., a display that moves a cursor up/down). The generated display is then transmitted to user equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
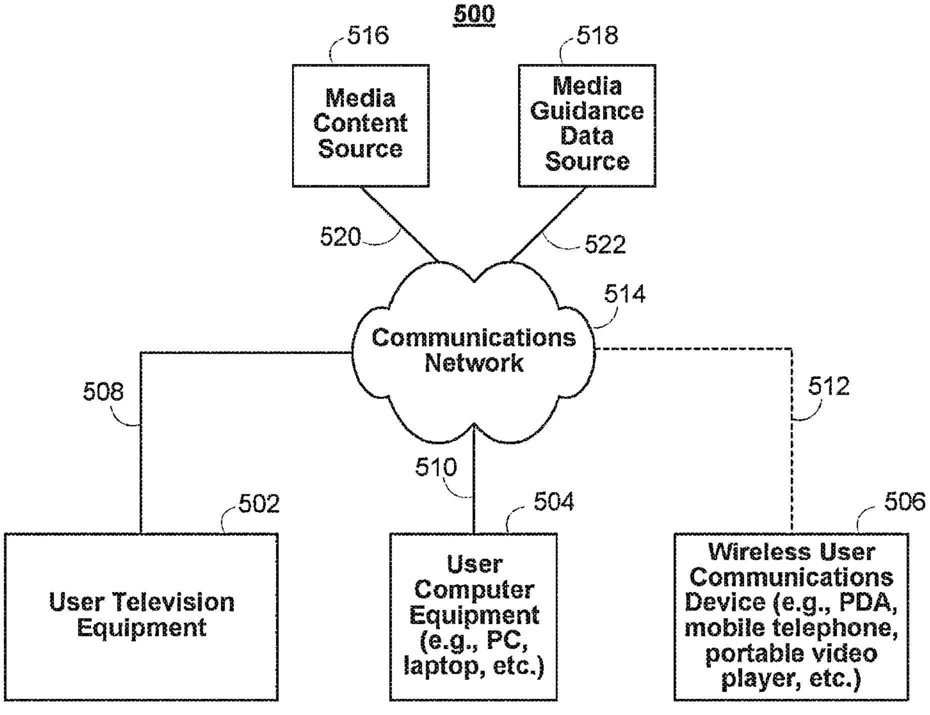
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a vehicle entertainment system. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, system 500 may include a global positioning system or GPS. A GPS uses the position of specialized satellites to determine a precise portion. The specialized satellites broadcast radio signals providing their locations and precise time from atomic clocks onboard. Since the time onboard the satellites are different from the time of the GPS system, the GPS system calculates its distance from the satellites using the difference in time. In order to obtain a precise location in three dimensions, a minimum of four satellites are needed.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between content sources 516 and 518 with user equipment devices 502, 504, and 506 are shown as through communications network 514, in some embodiments, content sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with media guidance data source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a systemspecified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user equipment, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud cither directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

As referred to herein, a "playback operation" refers to any media guidance application operation that relates to playing back a media asset. In some embodiments, the media guidance application may perform a fast-access playback operation. As referred to herein, the phrase "fast-access playback operations" should be understood to mean any playback operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter, or any other operation that does not play back the media asset at normal playback speed. The fast-access playback operation may be any playback operation that is not "play," where the play operation plays back the media asset at normal playback speed.

Figure 6:
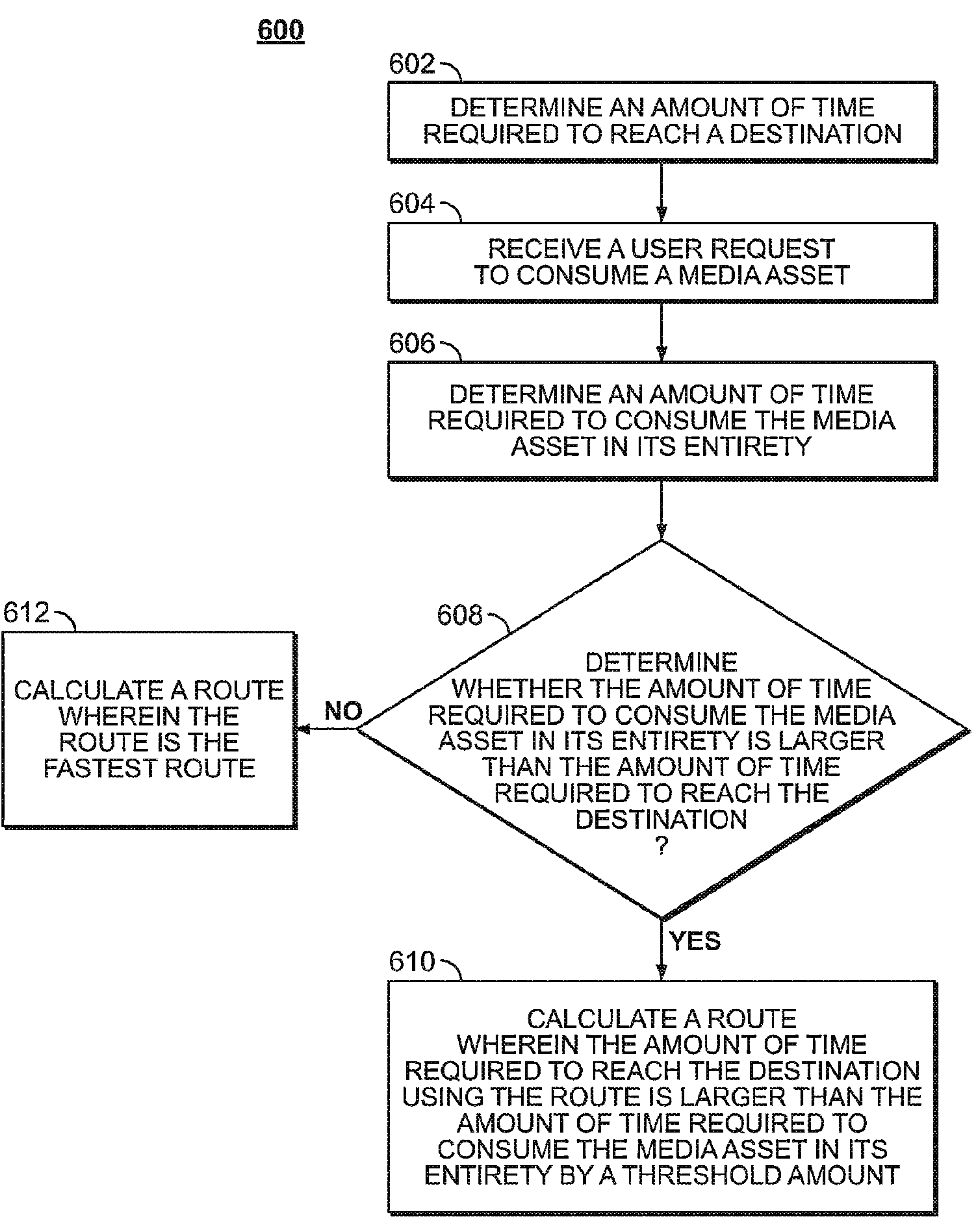
FIG. 6 is a flowchart of illustrative steps for calculating a route in accordance with some embodiments of the disclosure.

FIG. 6 is a flowchart of illustrative steps for calculating a route, in accordance with some embodiments of the disclosure. For example, a media guidance application implementing process 600 may be executed by control circuitry 404 (FIG. 4). It should be noted that process 600 or any step thereof could be performed on, or provided by, any of the devices or equipment shown in FIGS. 4-5.

Process 600 begins at 602, where the media guidance application begins a process for determining an amount of time required to reach a destination. For example, the media guidance application may execute (e.g., via control circuitry 404 (FIG. 4)) a program script initializing process 600. The media guidance application may display the amount of time required to reach the destination in arrival time region 102 of navigation display screen 100.

Process 600 continues to 604, where the media guidance application receives a user request to consume a media asset. In some embodiments, the user may request to consume the media asset using navigation display screen 100. In some embodiments, the user may request to consume the media asset using a personal device such as a cell phone or a tablet.

Process 600 continues to 606, where the media guidance application begins a process for determining an amount of time required to consume the media asset in its entirety. The media guidance application may display the amount of time required to consume the media asset in media asset length region 104 of navigation display screen 100.

Process 600 continues to 608, where the media guidance application begins a process for determining whether the amount of time required to consume the media asset in its entirety is larger than the amount of time required to reach the destination. For example, control circuitry 404 (FIG. 4) may compare the amount of time required to consume the media asset in its entirety and the amount of time required to reach the destination.

If the amount of time required to consume the media asset in its entirety is larger than the amount of time required to reach the destination, Process 600 continues to 610, where the media guidance application begins a process for calculating a route, wherein the amount of time required to reach the destination using the route is larger than the amount of time required to consume the media asset in its entirety by a threshold amount. The media guidance application may display the route in map region 112 of navigation display screen 100. For example, alternate route 120 may correspond to the calculated route.

If the amount of time required to consume the media asset in its entirety is not larger than the amount of time required to reach the destination, Process 600 continues to 612, where the media guidance application begins a process for calculating a route, wherein the route is the fastest route. The media guidance application may display the route in map region 112 of navigation display screen 100. For example, original route 118 may correspond to the calculated route.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 6.

Figure 7:
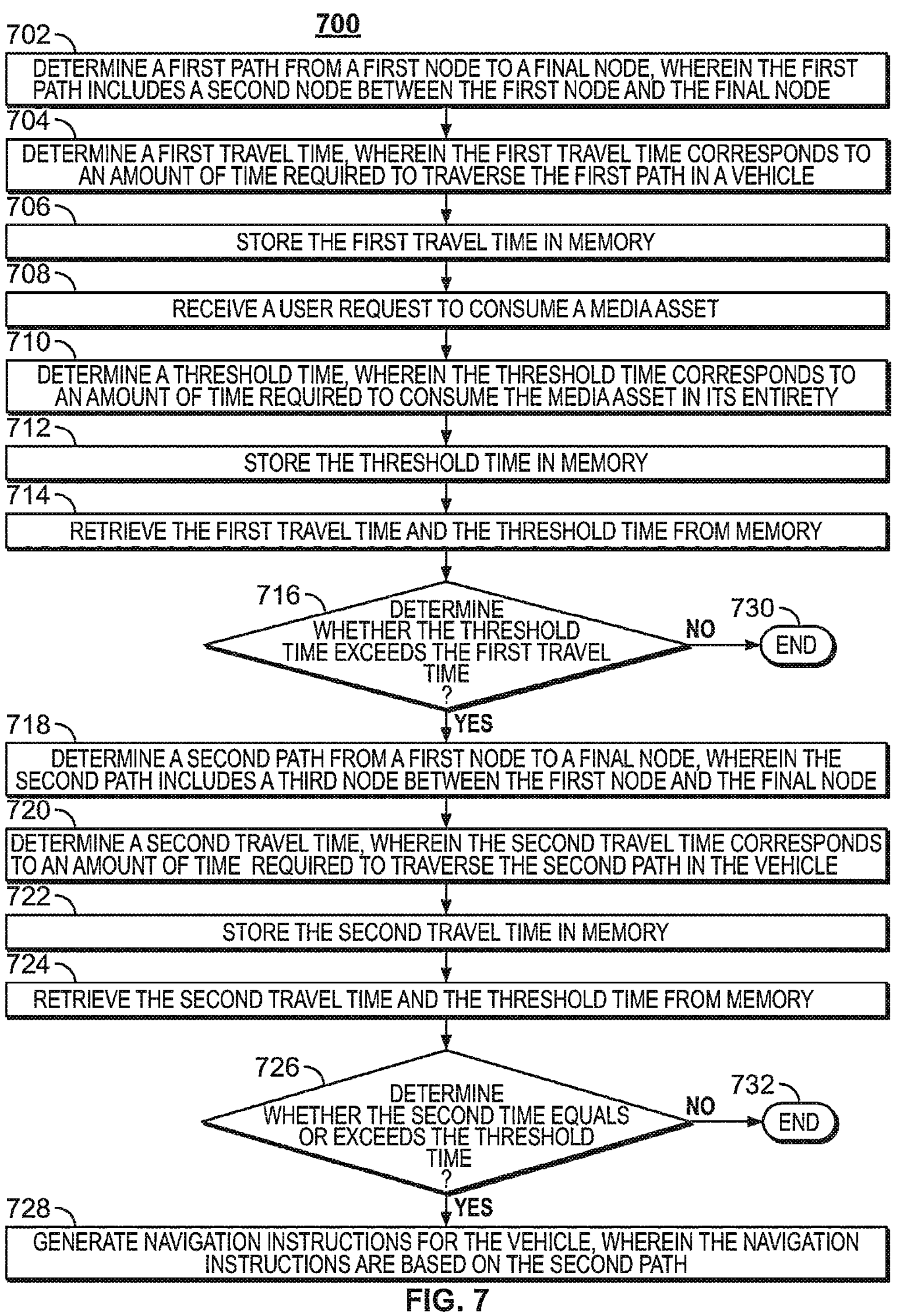
FIG. 7 is a flowchart of illustrative steps for calculating a route in accordance with some embodiments of the disclosure.

FIG. 7 is a flowchart of illustrative steps for calculating a route, in accordance with some embodiments of the disclosure. For example, a media guidance application implementing process 700 may be executed by control circuitry 404 (FIG. 4). It should be noted that process 700 or any step thereof could be performed on, or provided by, any of the devices or equipment shown in FIGS. 4-5.

Process 700 begins at 702, where the media guidance application begins a process for determining a first path from a first node to a final node, wherein the first path includes a second node between the first node and the final node. For example, the media guidance application may execute (e.g., via control circuitry 404 (FIG. 4)) a program script initializing process 700. The determination of a path may be performed using any suitable best path algorithm such as Dijkstra's algorithm, A*, and breadth-first search. In some embodiments, the first path is defined by a series of roads, traversable with a vehicle, connecting the first node to the final node. The road may be a paved road and may be a local road or a highway. In some embodiments, the first node corresponds to an intersection of a plurality of roads, wherein each of the plurality of roads is traversable with a vehicle. The intersection may be of two local roads, two highways, or a local road and a highway.

In some embodiments, the media guidance application may use Dijkstra's algorithm to determine a path. Dijkstra's algorithm finds the shortest path between the first node and the final node by calculating the distance from the first node to every node near the first node, choosing the nearest node and calculating the distance from the nearest node to every node near the nearest node not including the first node. Multiple iterations of this process are performed until the final node is reached using the shortest distance. The physical location of the nodes may be obtained using the GPS in system 500.

In some embodiments, the media guidance application may use A* to determine a path. A* finds the shortest path using an informed search algorithm, which uses information related to the general direction of the final node. Specifically, A* selects the path that minimizes $f(n)=g(n)+h(n)$, where n is the current node being analyzed, $g(n)$ is the total distance from the first node to the current node, and $h(n)$ is a heuristic function that estimates the total distance from the current node to the final node.

In some embodiments, the media guidance application may use breadth-first search to determine a path. Breadth-first search finds the shortest path between the first node and the final node by calculating every possible path using every possible intermediate node. The shortest path is then selected from every possible path.

Process 700 continues to 704, where the media guidance application begins a process for determining a first travel time, wherein the first travel time corresponds to an amount of time required to traverse the first path in a vehicle. The determination may be made using a navigation system of the self-driving car. In some embodiments, the first travel time may include travel delays associated with traffic and weather. For example, the media guidance application may display the first travel time in arrival time region 102 of navigation display screen 100.

Process 700 continues to 706, where the media guidance application stores the first travel time in memory (e.g., storage device 408 (FIG. 4)). Storing the first travel time in memory may be performed using processing circuitry 406 (FIG. 4) and any suitable storage device (e.g., storage device 408 (FIG. 4)). In some embodiments, the first travel time may be dynamically updated if travel conditions change during the trip.

Process 700 continues to 708, where the media guidance application receives a user request to consume a media asset. For example, the user may use a user interface (e.g., user input interface 410 (FIG. 4) to select a movie to consume during the trip. The user interface may comprise a touch-screen display. In some embodiments, the user request may be performed using a voice command. In some embodiments, the user may request to consume the media asset using navigation display screen 100. In some embodiments, the user may request to consume the media asset using a personal device such as a cell phone or a tablet.

Process 700 continues to 710, where the media guidance application begins a process for determining a threshold time, wherein the threshold time corresponds to an amount of time required to consume the media asset in its entirety. The amount of time required to consume the media asset in its entirety may be retrieved from metadata associated with the media asset. For example, the media guidance application may display the threshold time in media asset length region 104 of navigation display screen 100.

Process 700 continues to 712, where the media guidance application stores the threshold time in memory (e.g., storage device 408 (FIG. 4)). The threshold time may be stored in the same storage device as the first travel time. In some embodiments, the media guidance application may adjust the threshold time based on a fast-access playback operation received while the user is consuming the media asset. For example, if the user selects to skip a portion of the movie, the threshold time is dynamically reduced an amount equal to the duration of the skipped portion of the movie.

Process 700 continues to 714, where the media guidance application retrieves the first travel time and the threshold time from memory (e.g., storage device 408 (FIG. 4)). Retrieval of the first travel time and the threshold time may be performed using processing circuitry 406 (FIG. 4) from the storage device where the first travel time and threshold time is stored.

Process 700 continues to 716, where the media guidance application begins a process for determining whether the threshold time exceeds the first travel time. For example, if the first travel time exceeds the threshold time, then the media asset will be consumed in its entirety before the vehicle arrives at the destination and the vehicle may use the first path to determine the route. If the first travel time does not exceed the threshold time, then the media asset cannot be consumed in its entirety before the vehicle arrives at the destination using the first path.

If the threshold time exceeds the first travel time, Process 700 continues to 718, where the media guidance application begins a process for determining a second path from the first node to the final node, wherein the second path includes a third node between the first node and the final node. In some embodiments, the second path may include the second node. For example, the first path may comprise travelling on a highway for the majority of the path, and the second path may comprise travelling on local roads for the majority of the path. If the threshold time does not exceed the first travel time, Process 700 continues to 730, where the media guidance application ends Process 700.

Process 700 continues to 720, where the media guidance application begins a process for determining a second travel time, wherein the second travel time corresponds to an amount of time required to traverse the second path in the vehicle. The second travel time may exceed the first travel time if a longer route is determined.

Process 700 continues to 722, where the media guidance application stores the second travel time in memory (e.g., storage device 408 (FIG. 4)). Storing the second travel time in memory may be performed using processing circuitry 406 (FIG. 4) and the same storage device (e.g., storage device 408 (FIG. 4)) where the first travel time and threshold time is stored. In some embodiments, the second travel time may be dynamically updated if travel conditions change during the trip.

Process 700 continues to 724, where the media guidance application retrieves the second travel time and the threshold time from memory (e.g., storage device 408 (FIG. 4)). Retrieval of the second travel time and the threshold time may be performed using processing circuitry 406 (FIG. 4) from the storage device (e.g., storage device 408 (FIG. 4)) where the second travel time and threshold time is stored.

Process 700 continues to 726, where the media guidance application begins a process for determining whether the second time equals or exceeds the threshold time. For example, if the second travel time exceeds the threshold time, then the media asset will be consumed in its entirety before the vehicle arrives at the destination, and the vehicle may use the second path to determine the route. If the second travel time does not exceed the threshold time, then the media asset cannot be consumed in its entirety before the vehicle arrives at the destination using the second path.

If the second time equals or exceeds the threshold time, Process 700 continues to 728, where the media guidance application begins a process for generating navigation instructions for the vehicle, wherein the navigation instructions are based on the second path. In some embodiments, the media guidance application may generate for display the navigation instructions on a user interface in the vehicle. For example, the media guidance application may display the navigation instructions in map region 112 of navigation display screen 100. In some embodiments, the media guidance application may receive a user request to transmit the navigation instructions to a navigation system in the vehicle. For example, the media guidance application may present a query to the user in navigation query region 106 along with affirmative response region 108 and negative response region 110. The user may select affirmative response region 108 in order to instruct the media guidance application to transmit the navigation instructions to the navigation system in the vehicle. If the second time does not equal or exceed the threshold time, Process 700 continues to 732, where the media guidance application ends Process 700.

In some embodiments, the media guidance application may receive a user request to ignore the navigation instructions. The media guidance application may then generate secondary navigation instructions for the vehicle, wherein the secondary navigation instructions are based on the first path. The media guidance application may then transmit the secondary navigation instructions to the navigation system in the vehicle. For example, the user may select the negative response region 110 in order to instruct the media guidance application to transmit the secondary instructions to the navigation system in the vehicle. For example, if the user requests to watch a movie during a trip in a self-driving car, the user may be more interested in arriving at the destination as soon as possible instead of watching the movie in its entirety during the trip in the self-driving car.

In some embodiments, the media guidance application may generate an indication that the media cannot be consumed in its entirety. The media guidance application may generate for display the indication on the user interface in the vehicle. For example, if a user requests to watch a movie that is longer than the first travel time, the user may receive an indication on the user interface in the self-driving car that the movie cannot be watched in its entirety using the first path. In some embodiments, the media guidance application may generate for display alternative media options for the user to consume. The alternative media options may be shorter than the first travel time. For example, if a user requests to watch a movie that is longer than the first travel time, the user may receive alternative movies to watch that are shorter than the first travel time.

In some embodiments, the media guidance application may determine that the vehicle has arrived at the final node. The media guidance application may then receive a user request to finish consuming the media asset outside of the vehicle. For example, the user may use a user interface (e.g., user input interface 410 (FIG. 4) to request to finish consuming the media asset outside of the vehicle. The user interface may comprise a touch-screen display. In some embodiments, the request may be performed using a voice command. In some embodiments, the user may perform the request using navigation display screen 100. In some embodiments, the user may request to consume the media asset using a personal device such as a cell phone or a tablet. In some embodiments, the user may request to consume the media asset on a television. For example, if the user is watching a movie in the self-driving car that has not been watched in its entirety before arriving at the user's home, the user may request to finish watching the movie on the user's television in their home.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 7.

The pseudocode in FIG. 8 describes a process for calculating a route, in accordance with some embodiments of the disclosure. It will be evident to one skilled in the art that the process described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 404 (FIG. 4) initializes a subroutine to determine a first path from a first node to a final node, wherein the first path includes a second node between the first node and the final node. For example, control circuitry 404 (FIG. 4) may copy instructions from non-transitory storage medium (e.g., storage device 408 (FIG. 4)) into RAM or into the cache for processing circuitry 406 (FIG. 4) during the initialization stage. For example, a separate routine may determine a path from the first node to the final node and then pass the result as parameters to the pseudocode (e.g., as input to a method). The separate routine may comprise any suitable best path algorithm such as Dijkstra's algorithm, A*, and breadth-first search, as described above.

At line 803, control circuitry 404 (FIG. 4) executes a routine to determine a first travel time, wherein the first travel time corresponds to an amount of time required to traverse the first path in a vehicle. At line 805, control circuitry 404 (FIG. 4) stores the first travel time in memory (e.g., storage device 408 (FIG. 4)).

At line 807, control circuitry 404 (FIG. 4) receives a user request to consume a media asset. For example, control circuitry 404 (FIG. 4) may receive, via user input using user input interface 410 (FIG. 4), the user request to consume the media asset.

At line 809, control circuitry 404 (FIG. 4) executes a routine to determine a threshold time, wherein the threshold time corresponds to an amount of time required to consume the media asset in its entirety. At line 811, control circuitry 404 (FIG. 4) stores the threshold time in memory (e.g., storage device 408 (FIG. 4)).

At line 813, control circuitry 404 (FIG. 4) retrieves the first travel time and the threshold time from memory (e.g., storage device 408 (FIG. 4)). At line 815, control circuitry 404 (FIG. 4) executes a routine to determine whether the threshold time exceeds the first travel time.

At line 817, control circuitry 404 (FIG. 4) executes a routine to determine a second path from a first node to a final node, wherein the second path includes a third node between the first node and the final node.

At line 819, control circuitry 404 (FIG. 4) executes a routine to determine a second travel time, wherein the second travel time corresponds to an amount of time required to traverse the second path in the vehicle. At line 821, control circuitry 404 (FIG. 4) stores the second travel time in memory (e.g., storage device 408 (FIG. 4)).

At line 823, control circuitry 404 (FIG. 4) retrieves the second travel time and the threshold time from memory (e.g., storage device 408 (FIG. 4)). At line 825, control circuitry 404 (FIG. 4) executes a routine to determine whether the second time equals or exceeds the threshold time.

At line 827, control circuitry 404 (FIG. 4) iterates through the various selected media assets; if only a single media asset has been selected, the loop will only execute once. This loop may be implemented in multiple fashions depending on the choice of hardware and software language used to implement the algorithm of FIG. 8; for example, this may be implemented as part of a "for" or "while" loop.

At line 828, control circuitry 404 (FIG. 4) stores whether the first travel time equals or exceeds the threshold time as a Boolean variable "A." In some embodiments, the variable will be stored as part of a larger data structure or class, and the value of Boolean variable A may be obtained through appropriate accessor methods.

At line 829, control circuitry 404 (FIG. 4) stores whether the second time equals or exceeds the threshold time as a Boolean variable "B." In some embodiments, the variable will be stored as part of a larger data structure or class, and the value of Boolean variable B may be obtained through appropriate accessor methods.

At line 830, control circuitry 404 (FIG. 4) determines whether the logical statement is true (e.g., that the first travel time equals or exceeds the threshold time). If the statement is true, then at line 831, control circuitry 404 (FIG. 4) executes a subroutine to generate navigation instructions for the vehicle based on the first path.

At line 832, control circuitry 404 (FIG. 4) determines whether the logical statement is true (e.g., that the second travel time equals or exceeds the threshold time). If the statement is true, then at line 833, the control circuitry 404 (FIG. 4) executes a subroutine to generate navigation instructions for the vehicle based on the second path.

At line 835, control circuitry 404 (FIG. 4) runs a termination subroutine after the algorithm has performed its function. For example, in some embodiments control circuitry 404 (FIG. 4) may destruct variables, perform garbage collection, free memory or clear the cache of processing circuitry 406 (FIG. 4).

It will be evident to one skilled in the art that process 800 described by the pseudocode may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 9:
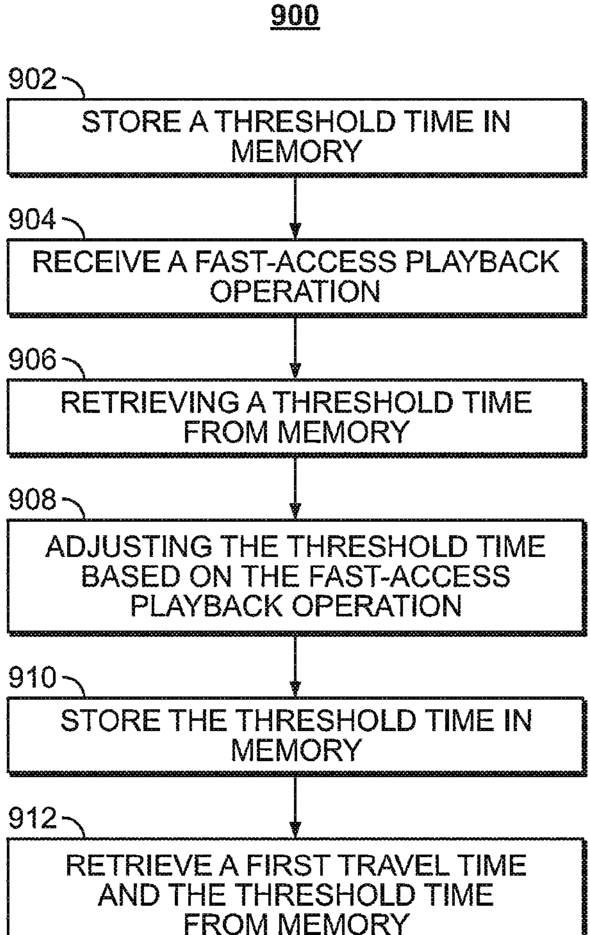
FIG. 9 is a flowchart of illustrative steps for calculating a route in accordance with some embodiments of the disclosure.

FIG. 9 is a flowchart of illustrative steps for calculating a route, in accordance with some embodiments of the disclosure. For example, a media guidance application implementing process 900 may be executed by control circuitry 404

(FIG. 4). It should be noted that process 900 or any step thereof could be performed on, or provided by, any of the devices or equipment shown in FIGS. 4-5.

Process 900 begins at 902, where the media guidance application stores the threshold time in memory (e.g., storage device 408 (FIG. 4)) as described by step 712 of Process 700.

Process 900 continues to 904, where the media guidance application receives a fast-access playback operation. For example, the user may use a user interface (e.g., user input interface 410 (FIG. 4) to select a fast-access playback operation on a movie that is being consumed during the trip. The user interface may comprise a touch-screen display. In some embodiments, the fast-access playback operation may be performed using a voice command. In some embodiments, the user may perform the fast-access playback operation using navigation display screen 100. In some embodiments, the user may request to consume the media asset using a personal device such as a cell phone or a tablet. For example, the user may want to skip a portion of the movie in order to finish the movie faster. Alternatively, the user may want to return to a previous portion of the movie if the user was not paying attention to the movie during the previous portion.

Process 900 continues to 906, where the media guidance application retrieves the threshold time from memory (e.g., storage device 408 (FIG. 4). Retrieval of the threshold time may be performed using processing circuitry 406 (FIG. 4) from the storage device where the threshold time is stored.

Process 900 continues to 908, where the media guidance application begins a process for adjusting the threshold time based on the fast-access playback operation. For example, if the user skipped a portion of the movie, the threshold time is reduced by the amount of time skipped in the movie. Alternatively, if the user returned to a previous portion of the movie, the threshold time is increased by the amount of time added by the return to the previous portion of the movie.

Process 900 continues to 910, where the media guidance application stores the threshold time in memory (e.g., storage device 408 (FIG. 4)). Storing the threshold time in memory may be performed using processing circuitry 406 (FIG. 4) and any suitable storage device (e.g., storage device 408 (FIG. 4)).

Process 900 continues to 912, where the media guidance application retrieves the first travel time and the threshold time from memory (e.g., storage device 408 (FIG. 4) as described by step 714 of Process 700.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 9.

Figure 10:
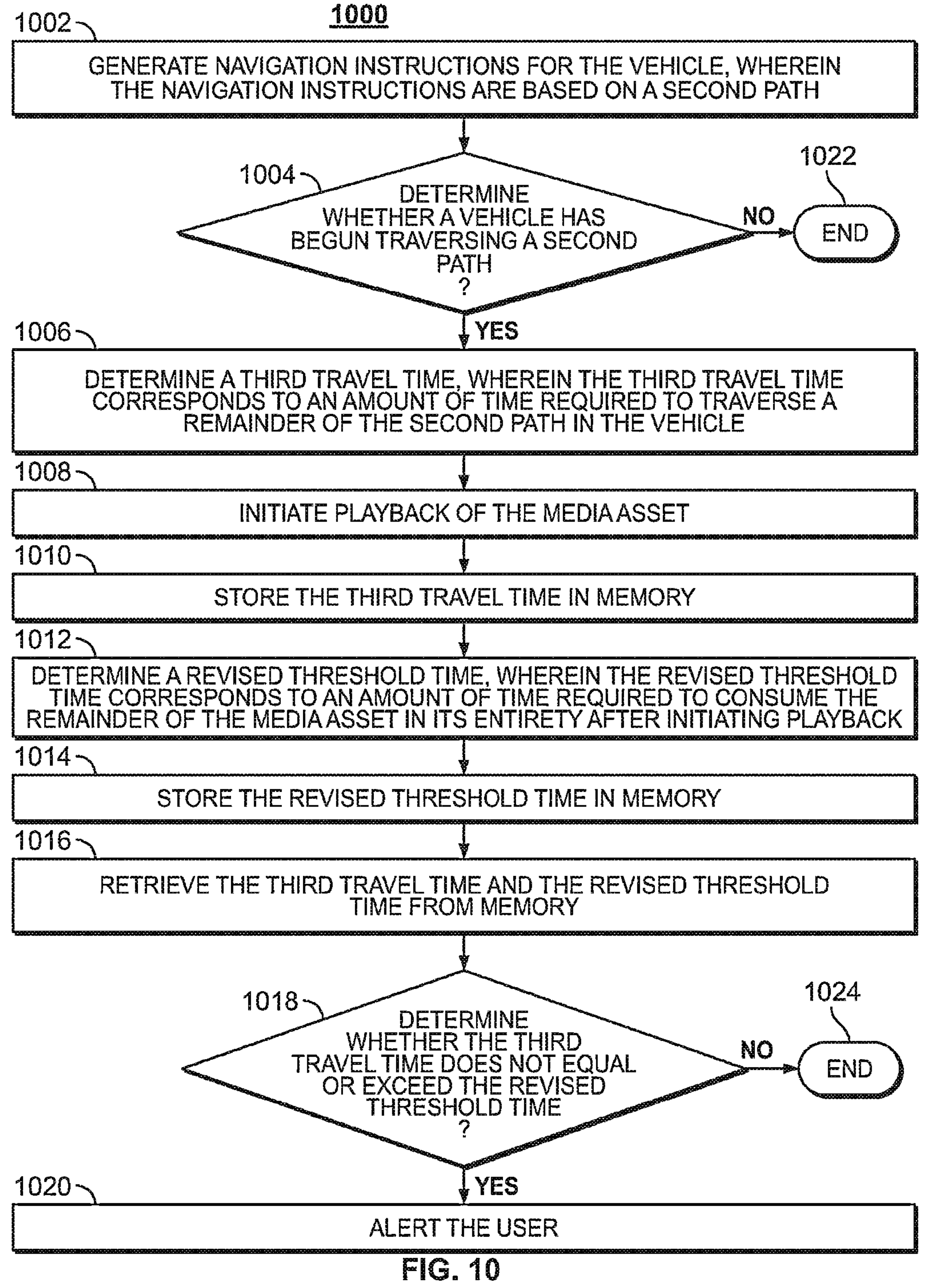
FIG. 10 is a flowchart of illustrative steps for calculating a route in accordance with some embodiments of the disclosure.

FIG. 10 is a flowchart of illustrative steps for calculating a route, in accordance with some embodiments of the disclosure. For example, a media guidance application implementing process 1000 may be executed by control circuitry 404 (FIG. 4). It should be noted that process 1000 or any stop thereof could be performed on, or provided by, any of the devices or equipment shown in FIGS. 4-5.

Process 1000 begins at 1002, where the media guidance application begins a process for generating navigation instructions for the vehicle, wherein the navigation instructions are based on the second path, as described by step 728 of Process 700.

Process 1000 continues to 1004, where the media guidance application begins a process for determining whether a vehicle has begun traversing a second path. In some embodiments, the media guidance application may determine that the vehicle has begun traversing the second path based on the response of the user to a query in navigation query region 106. For example, the user may select the negative response region 110 in order to instruct the media guidance application to transmit the secondary instructions to the navigation system in the vehicle. Once the secondary instructions have been transmitted to the navigation system in the vehicle, the media guidance application can determine that the vehicle has begun traversing the second path. In some embodiments, the media guidance application may determine that the vehicle has begun traversing the second path based on navigation data from a GPS system.

If the vehicle has begun traversing a second path, Process 1000 continues to 1006, where the media guidance application begins a process to determine a third travel time, wherein the third travel time corresponds to an amount of time required to traverse a remainder of the second path in the vehicle. If the vehicle has not begun traversing a second path, Process 1000 continues to 1022, where the media guidance application ends Process 1000. For example, if the vehicle has been traversing the second path and encounters unexpected traffic delay, the third travel time would correspond to the amount of time required to traverse the remainder of the second path including the unexpected traffic delay.

Process 1000 continues to 1008, where the media guidance application begins a process for initiating playback of the media asset. Playback of the media asset may be performed by control circuitry 404 (FIG. 4) using display 412 (FIG. 4) and speakers 414 (FIG. 4). For example, if the user selected a movie to be consumed during the trip, the movie would begin playing.

Process 1000 continues to 1010, where the media guidance application stores the third travel time in memory (e.g., storage device 408 (FIG. 4)). Storing the third time in memory may be performed using processing circuitry 406 (FIG. 4) and any suitable storage device (e.g., storage device 408 (FIG. 4).

Process 1000 continues to 1012, where the media guidance application begins a process for determining a revised threshold time, wherein the revised threshold time corresponds to an amount of time required to consume the remainder of the media asset in its entirety after initiating playback. For example, if the user has been watching a movie for 10 minutes, the revised threshold time is 10 minutes less than the threshold time.

Process 1000 continues to 1014, where the media guidance application stores the revised threshold time in memory (e.g., storage device 408 (FIG. 4). Storing the revised threshold time in memory may be performed using processing circuitry 406 (FIG. 4) and any suitable storage device (e.g., storage device 408 (FIG. 4)).

Process 1000 continues to 1016, where the media guidance application retrieves the third travel time and the revised threshold time from memory (e.g., storage device 408 (FIG. 4)). Retrieval of the third travel time and the revised threshold time may be performed using processing circuitry 406 (FIG. 4) from the storage device where the threshold time is stored (e.g., storage device 408 (FIG. 4)).

Process 1000 continues to 1018, where the media guidance application begins a process for determining whether the third travel time does not equal or exceed the revised threshold time. For example, if the third travel time exceeds the revised threshold time, then the media asset will be consumed in its entirety before the vehicle arrives at the destination. If the third travel time does not exceed the revised threshold time, then the media asset cannot be consumed in its entirety before the vehicle arrives at the destination using the second path.

If the third travel time does not equal or exceed the revised threshold time, Process 1000 continues to 1020, where the media guidance application begins a process for alerting the user. If the third travel time equals or exceeds the revised threshold time, Process 1000 continues to 1024, where the media guidance application ends Process 1000. For example, if a previously closed lane on a highway on the second path is opened up for traffic, then the amount of time required to traverse the remainder of the second path may be reduced and the third travel time may not exceed the revised threshold time. For example, if the third travel time is 50 minutes and the amount of time left in order to consume a movie in its entirety is 60 minutes, the media guidance application may alert the user that the remaining travel time is less than the time left to consume the movie.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 10.

Figure 11:
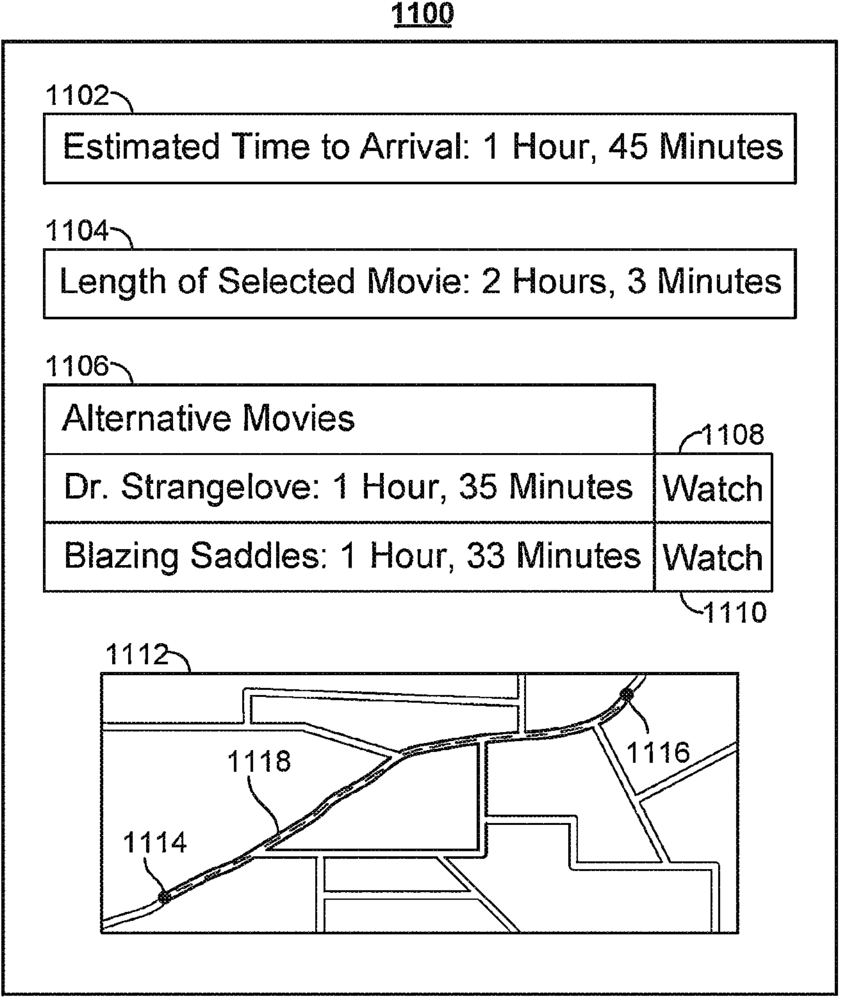
FIG. 11 is an illustrative example of a navigation display screen in accordance with some embodiments of the disclosure.

FIG. 11 is an illustrative example of a navigation display screen in accordance with some embodiments of the disclosure. For example, a media guidance application as described herein may generate navigation display screen 1100 or the information used by, or transmitted to, navigation display screen 1100. For example, navigation display screen 1100 may be incorporated into, or accessible by, a device upon which a media guidance application is implemented. Navigation display screen 1100 may include arrival time region 1102 and media asset length region 1104. Arrival time region 1102 may display the estimated time to arrival of the current route. For example, the media guidance application may determine the estimated time to arrival by determining a best path from a first node to a final node and determining a travel time corresponding to the amount of time required to traverse the best path, as discussed below. Media asset length region 1104 may display the length of the selected media asset. For example, the media guidance application may determine a threshold time that corresponds to an amount of time required to consume the media asset in its entirety, as discussed below. For example, if the user selected a movie to be consumed during the current trip, the length of the selected movie may be displayed. The estimated time displayed in arrival time region 1102 and media asset length region 1104 may comprise an amount of time in hours and minutes. In some embodiments, the estimated time displayed in arrival time region 1102 and media asset length region 1104 may comprise an amount of time in minutes and seconds.

Navigation display screen 1100 may include alternative media asset region 1106 and media asset selection regions 1108 and 1110. Alternative media asset region 1106 may display alternative media assets for a user to consume during a trip. In some embodiments, the length of the alternative media assets is less than the estimated time to arrival displayed in arrival time region 1102. For example, the media guidance application may display two movies whose length is less than the estimated time to arrival. In some embodiments, the alternative media assets are recommended based on the selected media asset. For example, if the user selected a classic comedy movie to watch during a trip, the media guidance application may display other classic comedy movies whose length is less than the estimated time to arrival. Media asset selection regions 1108 and 1110 may display an indication in relation to the alternative media assets in alternative media asset region 1106. For example, the word "watch" may be displayed in media asset selection regions 1108 and 1110. In a further example, a checkmark may be displayed in media asset selection regions 1108 and 1110.

Navigation display screen 1100 may be a touchscreen. For example, the user may touch the region of navigation display screen 1100 corresponding to media asset selection region 1108 in order to select the first alternative media asset in alternative media asset region 1106. In a further example, the user may touch the region of navigation display screen 1100 corresponding to media asset selection region 1110 in order to select the second alternative media asset in alternative media asset region 1106.

Navigation display screen 1100 may include map region 1112. Map region 1112 may include departure point 1114 and destination point 1116. Departure point 1114 and destination point 1116 may correspond to physical locations. For example, departure point 1114 may correspond to the user's home address and destination point 1116 may correspond to a hotel. Map region 1112 may include current route 1118. Current route 1118 may correspond to the fastest route between departure point 1114 and destination point 1116. For example, the media guidance application may determine the fastest path between a first node and a final node and generate navigation instructions for the vehicle based on the first path, as discussed below.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:

providing, using processing circuitry, a user interface on a display of a vehicle that is travelling along a recommended navigation path from a current location to a destination location, wherein the display is communicatively coupled to the processing circuitry;

receiving, via the user interface, a selection of a content identifier displayed on the user interface, wherein the content identifier corresponds to a media content item;

determining, using the processing circuitry, that a first amount of time needed for full consumption of the media content item is longer than a second amount of time needed for the vehicle to arrive at the destination;

based on: (a) the selection of the content identifier corresponding to the media content item received via the user interface, and (b) the determining that the first amount of time needed for full consumption of the media content item is longer than the second amount of time needed for the vehicle to arrive at the destination:

identifying, using the processing circuitry, a different media content item of the same genre as the media content item, wherein a third amount of time needed for full consumption of the different media content item is shorter than the second amount of time needed for the vehicle to arrive at the destination; and modifying, using the processing circuitry, the user interface displayed on the display of the vehicle to comprise an additional content identifier corresponding to the different media content item, wherein selection of the additional content identifier causes playing of the different media content item instead of the media content item.

2. The method of claim 1, further comprising generating, using the processing circuitry, navigation instructions for traversing the vehicle along the recommended navigation path on the display.

3. The method of claim 1, further comprising transmitting, using the processing circuitry, navigation instructions for traversing the vehicle along the recommended navigation path to one or more of a navigation device of the vehicle or an end user device communicatively coupled to the vehicle.

4. The method of claim 1, further comprising:

receiving, through the user interface, an input to ignore navigation instructions for traversing the vehicle along the recommended navigation path;

in response to receiving the input to ignore the navigation instructions, generating, using the processing circuitry, alternative navigation instructions for traversing the vehicle along a new recommended path to arrive at the destination location;

determining, using the processing circuitry, the media content item requires more time to be consumed entirely than an amount of time for the vehicle to arrive at the destination location from the current location using the new recommended path; and based on the determining, identifying, using the processing circuitry, the different media content item based at least in part on an amount of time required for full consumption of the different media content item as compared to the amount of time for the vehicle to traverse from the current location to the destination location using the new recommended path.

5. The method of claim 1, further comprising:

determining, using the processing circuitry, the vehicle arrived at the destination location; and in response to determining the vehicle arrived at the destination location, generating for display a selectable option to resume playback of the media content item using a device external to the vehicle.

6. The method of claim 1, further comprising:

receiving, through the user interface, a request to modify a rate of playback of the media content item;

in response to the receiving, determining, using the processing circuitry, an amount of time to consume a remaining portion of the media content item does not exceed the amount of time for the vehicle to arrive at the destination location from the current location using the recommended navigation path; and generating, using the processing circuitry, on the display a selectable option to resume playback of the media content item, wherein the selectable option includes updated duration information.

7. The method of claim 6, further comprising:

in response to determining the amount of time to consume the remaining portion of the media content item does exceed the amount of time for the vehicle to arrive at the destination location from the current location using the recommended navigation path, generating updated navigation instructions to require more time for the vehicle to arrive at the destination location; and adjusting, using the processing circuitry, display of navigation instructions defining the recommended navigation path to include a selectable option to modify the recommended navigation path based on the updated navigation instructions.

8. The method of claim 1, further comprising generating, using the processing circuitry, an alert on the display that the media content item requires more time for full consumption of the media content item than the second amount of time.

9. The method of claim 1, further comprising:

determining, using the processing circuitry, current traffic conditions cause an increase of the second amount of time;

identifying, based on the current traffic conditions, an alternative traversable path from the current location to the destination location; and generating, using the processing circuitry, at least one selectable option at the display for the different media content item, wherein the different media content item is presented based at least in part on a comparison of the third amount of time to a fourth amount of time required to travel along the alternative traversable path from the current location to the destination location.

10. The method of claim 9, further comprising:

in response to receiving through the user interface selection of the at least one selectable option, generating updated navigation instructions for the vehicle to arrive at the destination location from the current location along the alternative traversable path; and adjusting, using the processing circuitry, display of navigation instructions defining the recommended navigation path to include the updated navigation instructions.

11. A system comprising:

interface circuitry for receiving inputs communicatively coupled to a display in a vehicle, the interface circuitry being configured to:

generate, on the display, a user interface for interaction;

receive, via the user interface, a selection of a content identifier displayed on the user interface, wherein the content identifier corresponds to a media content item; and processing circuitry, communicatively coupled to the interface circuitry, configured to:

provide the user interface on the display while the vehicle is travelling along a recommended navigation path from a current location to a destination location, wherein the display is communicatively coupled to the processing circuitry;

determine that a first amount of time needed for full consumption of the media content item is longer than a second amount of time needed for the vehicle to arrive at the destination;

based on: (a) the selection of the content identifier corresponding to the media content item received via the user interface, and (b) the determining that the first amount of time needed for full consumption of the media content item is longer than the second amount of time needed for the vehicle to arrive at the destination:

identify a different media content item of the same genre as the media content item, wherein a third amount of time needed for full consumption of the different media content item is shorter than the second amount of time needed for the vehicle to arrive at the destination; and modify the user interface displayed on the display of the vehicle to comprise an additional content identifier corresponding to the different media content item, wherein selection of the additional content identifier causes playing of the different media content item instead of the media content item.

12. The system of claim 11, wherein the processing circuitry is further configured to generate navigation instructions for traversing the vehicle along the recommended navigation path on the display.

13. The system of claim 11, wherein the processing circuitry is further configured to transmit navigation instructions for traversing the vehicle along the recommended navigation path to one or more of a navigation device of the vehicle or an end user device communicatively coupled to the vehicle.

14. The system of claim 11, wherein:

the interface circuitry is further configured to:

receive, through the user interface, an input to ignore navigation instructions for traversing the vehicle along the recommended navigation path; and the processing circuitry is further configured to:

in response to receiving the input to ignore the navigation instructions, generate alternative navigation instructions for traversing the vehicle along a new recommended path to arrive at the destination location;

determine the media content item requires more time to be consumed entirely than an amount of time for the vehicle to arrive at the destination location from the current location using the new recommended path; and based on the determining, identify the different media content item that has the same genre as the media content item, wherein the different media content item requires less time to be consumed entirely than the amount of time for the vehicle to arrive at the destination location from the current location using the new recommended path.

15. The system of claim 11, wherein the processing circuitry is further configured to:

determine the vehicle arrived at the destination location; and in response to determining the vehicle arrived at the destination location, generate for display a selectable option to resume playback of the media content item using a device external to the vehicle.

16. The system of claim 11, wherein the processing circuitry is further configured to:

receive, through the user interface communicatively coupled to the processing circuitry, a request to modify a rate of playback of the media content item;

in response to the receiving, determine an amount of time to consume a remaining portion of the media content item does not exceed the amount of time for the vehicle to arrive at the destination location from the current location using the recommended navigation path; and generate on the at least one display communicatively coupled to the vehicle a selectable option to resume playback of the media content item, wherein the selectable option includes updated duration information.

17. The system of claim 16, wherein the processing circuitry is further configured to:

in response to determining the amount of time to consume the remaining portion of the media content item does exceed the amount of time for the vehicle to arrive at the destination location from the current location using the recommended navigation path, generate updated navigation instructions to require more time for the vehicle to arrive at the destination location; and adjust display of navigation instructions defining the recommended navigation path to include a selectable option to modify the recommended navigation path based on the updated navigation instructions.

18. The system of claim 11, wherein the processing circuitry is further configured to generate an alert on the display that the media content item requires more time for full consumption of the media content item than the second amount of time.

19. The system of claim 11, wherein the processing circuitry is further configured to:

determine current traffic conditions cause an increase of the second amount of time;

identify, based on the current traffic conditions, an alternative traversable path from the current location to the destination location; and generate at least one selectable option at the display for the different media content item, wherein the different media content item is presented based at list in part on a comparison of the third amount of time to a fourth amount of time required to travel along the alternative traversable path from the current location to the destination location.

20. The system of claim 19, wherein the processing circuitry is further configured to:

in response to receiving through the user interface selection of the at least one selectable option, generate updated navigation instructions for the vehicle to arrive at the destination location from the current location along the alternative traversable path; and adjust display of navigation instructions defining the recommended navigation path to include the updated navigation instructions.

* * * * *